(12) United States Patent
Duron et al.

(10) Patent No.: US 10,515,240 B1
(45) Date of Patent: Dec. 24, 2019

(54) METHOD, SYSTEM AND APPARATUS FOR RADIO-FREQUENCY ECHO CANCELLATION

(71) Applicant: Zebra Technologies Corporation, Lincolnshire, IL (US)

(72) Inventors: Mark W. Duron, Mastic, NY (US); Michael J. Koch, Fort Salonga, NY (US); Amit Asthana, Germantown, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/168,586

(22) Filed: Oct. 23, 2018

(51) Int. Cl.
*G06K 7/10* (2006.01)
*H01Q 1/22* (2006.01)

(52) U.S. Cl.
CPC ..... *G06K 7/10019* (2013.01); *G06K 7/10316* (2013.01); *H01Q 1/2216* (2013.01)

(58) Field of Classification Search
CPC .......... G06K 7/10366; G06K 7/10316; G06K 7/10009; G06K 19/0723; G06K 7/10356; G06K 19/0717; G06K 7/0008; G06K 7/10257; G06K 7/10128
USPC ....................................................... 340/10.1
See application file for complete search history.

(56) References Cited

U.S. PATENT DOCUMENTS

| 8,077,763 | B2 * | 12/2011 | Duron | ............... | H04B 1/525 |
| | | | | | 375/221 |
| 9,813,107 | B2 * | 11/2017 | Malarky | ............ | G06K 7/10009 |
| 2008/0136645 | A1 * | 6/2008 | Lin | .................. | G06K 7/0008 |
| | | | | | 340/572.4 |

* cited by examiner

*Primary Examiner* — Mark S Blouin
(74) *Attorney, Agent, or Firm* — Yuri Astvatsaturov (57) ABSTRACT

An RFID echo cancellation assembly includes: a circulator defining a transmission path from a transmit module to an antenna module, and a reception path from the antenna module to a receive module; a combiner on the reception path between the circulator and the receive module; a variable reflector for applying a cancellation signal to the combiner; a controller for setting an operational parameter at the variable reflector according to an attribute of a transmitted signal from the transmit module; and a coupler defining a segment of the transmission path between the transmit module and the circulator, and a cancellation path between the variable reflector and the combiner. The coupler couples a portion of the transmitted signal to the variable reflector, whereupon the variable reflector generates the cancellation signal based on the operational parameter, for transmission to the combiner via the cancellation signal path.

20 Claims, 7 Drawing Sheets

METHOD, SYSTEM AND APPARATUS FOR RADIO-FREQUENCY ECHO CANCELLATION

BACKGROUND

Radio frequency identification (RFID) technology may be deployed in a variety of environments, including retail stores, warehouses and the like, to track various types of objects. A typical RFID system includes an RFID reader or interrogator, and a plurality of RFID tags. The tags are typically associated with objects (e.g. items of clothing, boxes of inventory or the like) within the environment, and may be physically attached to such items. The RFID reader typically generates one or more outgoing interrogation signals, and at least one of the tags, upon receiving the interrogation signal, is configured to emit an RF response. The response may contain a stock keeping unit (SKU) code or other data identifying the object to which the tag is attached.

Response signals emitted by RFID tags are typically weak signals in comparison with the interrogation signal emitted by the RFID reader. Reflections and other interference from the environment, as well as internally generated echo signals within the RFID reader, may reduce the accuracy with which the reader can detect and interpret the tag responses.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an echo cancellation assembly for a radio frequency identification (RFID) tag reader, the assembly comprising: a circulator defining (i) a transmission signal path from a transmit module of the tag reader to an antenna module of the tag reader, and (ii) a reception signal path from the antenna module to a receive module of the tag reader; a combiner on the reception signal path between the circulator and the receive module; a variable reflector configured to apply a cancellation signal to the combiner for cancelling an antenna reflection on the reception signal path; a controller configured to set an operational parameter at the variable reflector according to an attribute of a transmitted signal from the transmit module; and a coupler defining (i) a segment of the transmission signal path between the transmit module and the circulator, and (ii) a cancellation signal path between the variable reflector and the combiner; wherein the coupler is configured to couple a portion of the transmitted signal to the variable reflector; and wherein the variable reflector is configured, responsive to receiving the portion of the transmitted signal, to generate the cancellation signal based on the operational parameter, for transmission to the combiner via the cancellation signal path.

Additional examples disclosed herein are directed to an echo cancellation method, comprising: obtaining, at a controller of a radio frequency identification (RFID) tag reader, a transmission attribute of a transmitted signal; setting an operational parameter at a variable reflector of the RFID tag reader based on the transmission attribute; generating the transmitted signal at a transmit module of the RFID tag reader; generating, at the variable reflector, a cancellation signal based on the transmitted signal and the operational parameter; detecting a received signal at an antenna module of the RFID tag reader; and applying the cancellation signal to the received signal.

Figure 1:
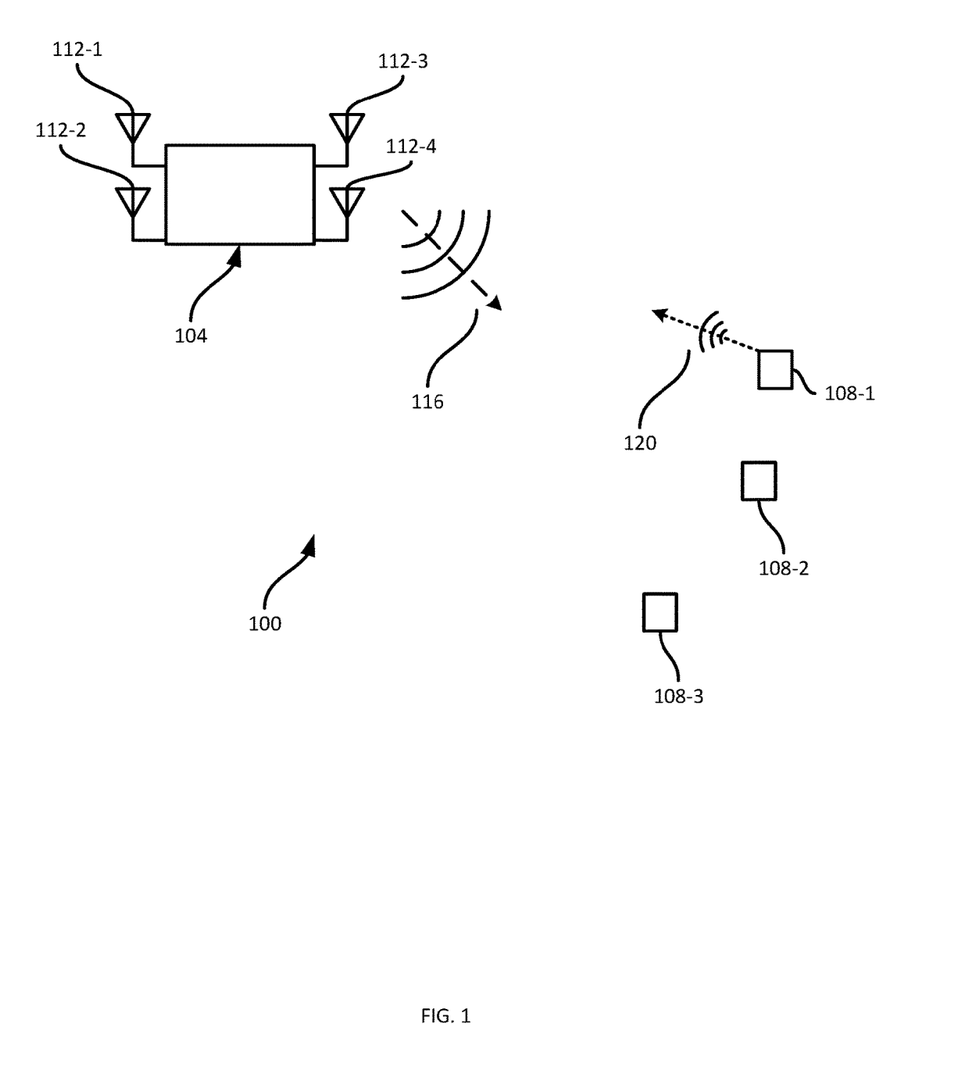
FIG. 1 is a schematic of an RFID system.

FIG. 1 depicts an RFID system 100 including an RFID reader 104 and a plurality of tags 108, three examples 108-1, 108-2, 108-3 of which are illustrated. The tags 108 may be deployed on any of a wide variety of objects (e.g. boxes or other items in a warehouse, retail facility, or the like). The reader 104 includes at least one antenna 112. Four antennae 112-1, 112-2, 112-3 and 112-4 are shown in FIG. 1, although it will be understood that the reader 104 can be provided with fewer than four antennae 112 or more than four antennae 112 in other examples. The antennae 112 can be implemented in a monostatic configuration, in which each antenna 112 is used for both transmitting and receiving functions, or in a bistatic configuration, in which certain antennae 112 are used solely for transmitting, while other antennae 112 are used solely for receiving.

The reader 104 is configured to emit, via a suitable combination of the antennae 112, an interrogation signal 116. One or more of the tags 108, upon detection of the interrogation signal 116, is configured to emit a response signal (e.g. the tag 108-1 is illustrated in FIG. 1 as emitting a response signal 120). The reader 104 is further configured to detect the response signal 120 (via the antennae 112), and to decode payload data contained therein, such as a tag identifier, an inventory identifier (e.g. a SKU code), or the like. The data decoded from the response signal 120 may be provided by the reader 104 to a computing device (not shown) such as a server, for further processing.

The reader 104 contains a transmit module for generating the interrogation signal 116, and a receive module for detecting the response signal 120 and decoding the above-mentioned payload data. The response signal 120, however, is typically a low-power signal (e.g. about −80 dBm) in comparison to the interrogation signal (e.g. about 30 dBm). Further, various interference, including echo signals internal to the reader 104, may have greater signal strength than the response signal 120 itself. The reader 104 is therefore configured, as will be discussed below, to apply echo cancellation to signals received at the antennae 112, to mitigate the negative effects of such echo signals on the detection and interpretation of the response signal 120.

Figure 2:
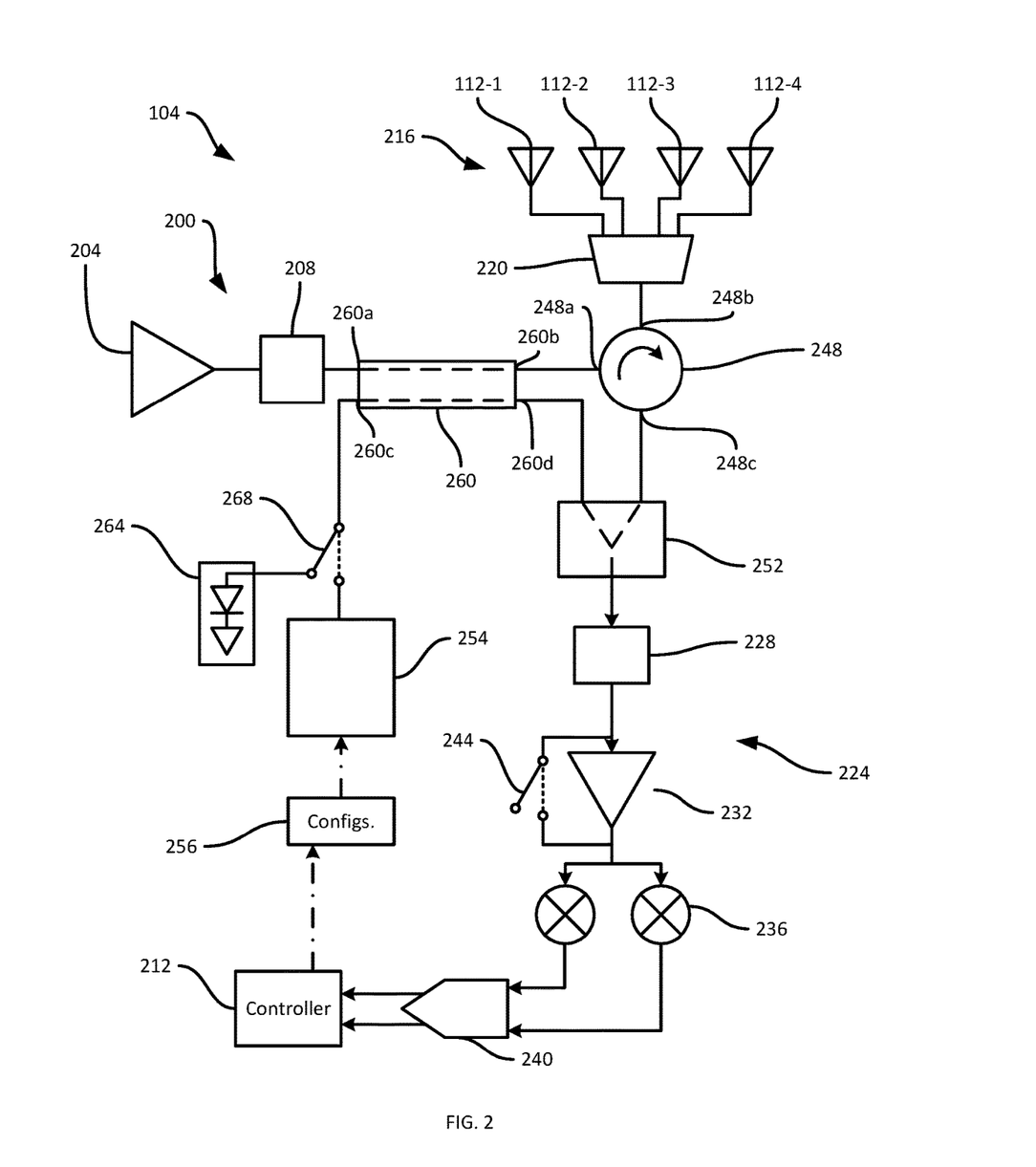
FIG. 2 is a block diagram of certain internal components of the RFID reader of FIG. 1.

Turning to FIG. 2, certain internal components of the reader 104 are illustrated. The reader 104 includes a transmit module 200 including a power amplifier 204 and, in the present example, a low-pass filter 208. As will be apparent, the transmit module 200 can include various other components upstream of the power amplifier 204, such as an oscillator, and the like. The transmit module 200 (e.g. the power amplifier 204 and/or other components of the transmit module 200 not shown in FIG. 2) can also be connected with a controller 212 of the reader 104, such as a baseband controller implemented as one or more integrated circuits (ICs).

The reader 104 also includes an antenna module 216 that includes, in the present example, the antennae 112 and a multiplexer 220, as well as a receive module 224 including a high-pass filter 228, a low-noise amplifier (LNA) 232 and a set of demodulators 236 (e.g. an in-phase demodulator and a quadrature demodulator) connected to an analog-to-digital (ADC) converter 240, which is in turn connected to the above-mentioned controller 212. In other embodiments, one or more of the filter 228 and the LNA 232 may be omitted. In the illustrated embodiment, the receive module 224 also includes a switch 244 controllable (e.g. by the controller 212) to enable and disable the LNA 232. That is, the switch 244 has an open position (shown in FIG. 2) for bypassing the LNA 232, and a closed position for enabling the LNA 232. As will be discussed below, the switch 244 may be operated by the controller 212 to enable or disable the LNA 232 based on the degree of echo cancellation achieved by the echo cancellation functionality implemented by the reader 104.

The reader 104 further includes a circulator 248 defining a transmission signal path from the transmit module 200 (specifically, from the filter 208) to the antenna module 216 (specifically, to the multiplexer 220. The circulator 248 also defines a reception signal path from the antenna module 216 to the receive module 224 (specifically, from the multiplexer 220 to the filter 228). The circulator 248, as will be apparent to those skilled in the art, includes three ports 248a, 248b and 248c. The above-mentioned transmission signal path travels from the filter 208, via the ports 248a and 248b, to the multiplexer 220. The reception signal path, on the other hand, travels from the multiplexer 220, via the ports 248b and 248c to the filter 228. As will also be apparent, the circulator 248 substantially prevents signal transmission between the ports 248a and 248c, although in practice a fraction of the signal travelling along the transmission signal path from the transmit module 200 may leak from the port 248a to the port 248c.

The reader 104 also includes a combiner 252 on the above-mentioned reception signal path, between the circulator 248 and the filter 228. The combiner 252 is configured to receive a signal on the reception signal path (i.e. from the port 248c of the circulator 248), as well as a cancellation signal, to be discussed in greater detail below. The combiner 252 is configured to combine the signal received on the reception signal path with the above-mentioned cancellation signal, and to apply the combined signal to the receive module 224.

The above-mentioned cancellation signal is generated by a variable reflector 254. The variable reflector 254 is configured to generate the cancellation signal according to one or more operational parameters set at the variable reflector 254. The operational parameters are stored in a configuration storage element 256 (also referred to simply as the configuration element 256), such as lookup table, auxiliary controller, or the like. In general, the storage element 256 is implemented as one or more integrated circuits, and may be a component of the controller 212 mentioned earlier. The particular operational parameters set at the variable reflector 254 from the configuration element 256 depend upon one or more attributes of the interrogation signal generated at the transmit module 200 for emission via the antenna module 216. The variable reflector 254 is then configured to generate the cancellation signal according to the currently set operational parameters and a portion of the transmitted signal that is coupled to the variable reflector 254 by a coupler 260.

The coupler 260 is a directional coupler having four ports 260a, 260b, 260c and 260d. The port 260a, which may also be referred to as the input port, receives the outgoing signal from the transmit module 200 (which may be referred to as the transmitted signal or the interrogation signal). The port 260b, which may also be referred to as the through port, is configured to transmit a portion (typically the majority) of the transmitted signal received at the port 260a towards the circulator 248. The port 260c, which may also be referred to as the coupled port, is configured to couple a portion (typically smaller than the portion of the transmitted signal passed through to the port 260b) of the transmitted signal received at the port 260a towards the variable reflector 254. The port 260c is also configured to receive the above-mentioned cancellation signal from the variable reflector 254, for emission at the port 260d (which may also be referred to as the isolated port).

As will now be apparent, the coupler 260 therefore defines a segment of the above-mentioned transmission signal path between the transmit module 200 and the circulator 248 (via the ports 260a and 260b). The coupler 260 also defines a cancellation signal path between the variable reflector 254 and the combiner 252 (via the ports 260c and 260d).

In other words, upon generation of the transmitted signal at the transmit module 200, the coupler 260 is configured to transmit a portion of the transmitted signal to the circulator 248 for emission via the antenna module 216, and also to couple the remainder of the transmitted signal to the variable reflector 254. The variable reflector 254, in response to receiving the remainder of the transmitted signal, is configured to generate the cancellation signal based on the operational parameters set by the configuration element 256. The cancellation signal is returned along the cancellation signal path, via the coupler 260, for application to the combiner. The cancellation signal and the received signal from the port 248c of the circulator 248 are combined at the combiner 252, resulting in the cancellation from the received signal of a substantial portion of the echo contained in the received signal. The echo, as will now be apparent to those skilled in the art, includes an internal reflection of the transmitted signal at the antenna module 216 (e.g. due to impedance mismatches within the antenna module 216). The echo may also include circulator leakage from the port 248a to the port 248c of the circulator 248, and may also include coupler leakage from the port 260a to the port 260d of the coupler 260.

Still further, as illustrated in FIG. 2, the reader 104 can include, in some embodiments, a power detector 264 connected to the cancellation signal path via a switch 268. The power detector 264 can be employed (e.g. via a connection to the controller 212) to monitor a power level of the transmitted signal based on the portion of the transmitted signal coupled via the port 260c of the coupler 260. Such monitoring may be employed, for example upon start-up of the reader 104, to adjust control parameters of the transmit module 200 to verify that the transmitted signal has a power level between predefined bounds. In some embodiments, in addition, the switch 268 can be employed (e.g. at start-up of the reader 104) by the configuration element 256 to set operational parameters at the variable reflector 254.

Figure 3A:
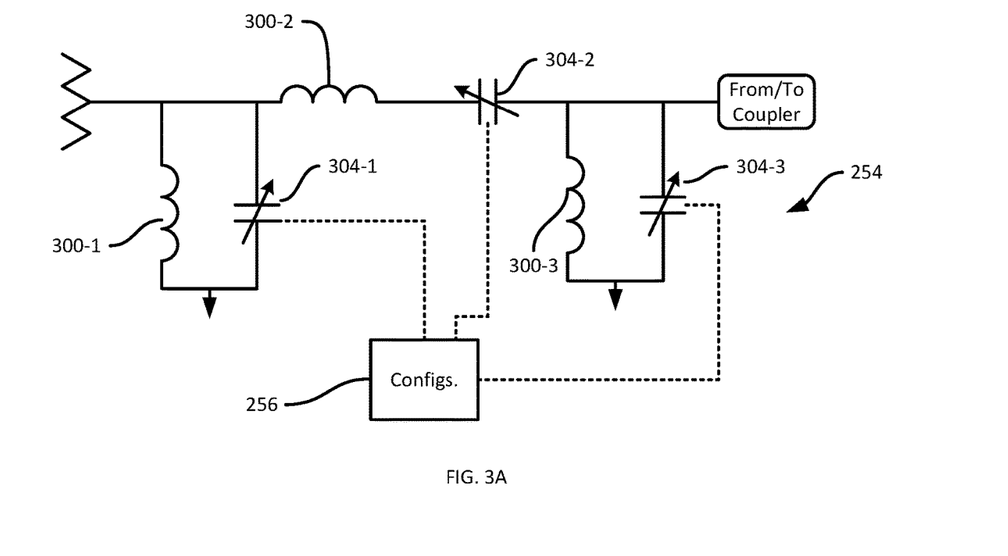
FIGS. 3A, 3B, 4A and 4B are block diagrams of certain internal components of the variable reflector of FIG. 2.
Figure 3B:
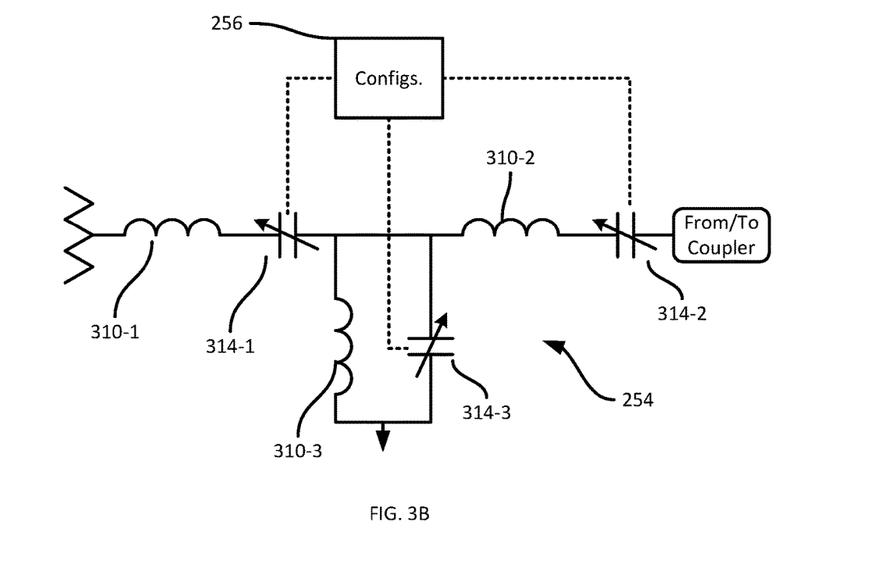

Turning now to FIGS. 3A and 3B, certain internal components of the variable reflector 254 will be discussed in greater detail, followed by a discussion of the selection of operational parameters for the variable reflector 254 during operation of the reader 104.

FIG. 3A illustrates the variable reflector 254 according to certain embodiments. The variable reflector 254, in general, is a resonant circuit. In the embodiment illustrated in FIG. 3A, the variable reflector 254 implements a pi network, including a first inductor 300-1 paired in parallel with a first configurable capacitor 304-1, a second inductor 300-2 in series with a second configurable capacitor 304-2, and a third inductor 300-3 in parallel with a third configurable capacitor 304-3.

The configurable capacitors 304, in the present example, are digitally tuned capacitors, and the operational parameters set at the capacitors by the configuration element 256 include capacitance values. For example, the configuration element 256 can store a plurality of configuration vectors, with each vector containing one capacitance value for each capacitor 304. The capacitors 304 may, for example, be set to one of 32 discrete states via a 5-bit operational parameter, and the above-mentioned vector stored by the configuration element 256 may therefore be a 15-bit value. In other examples, the capacitors 304 may employ longer or shorter operational parameters. Further, various other formats may also be employed for storing operational parameters in the configuration element 256.

FIG. 3B illustrates another example variable reflector 254 configured as a T network, including a first inductor 310-1 in series with a first configurable capacitor 314-1, a second inductor 310-2 in series with a second configurable capacitor 314-2, and a third inductor 310-3 in parallel with a third configurable capacitor 314-3. Various other structures for the variable reflector 254 will also be apparent, including configurations based on L networks.

Figure 4A:
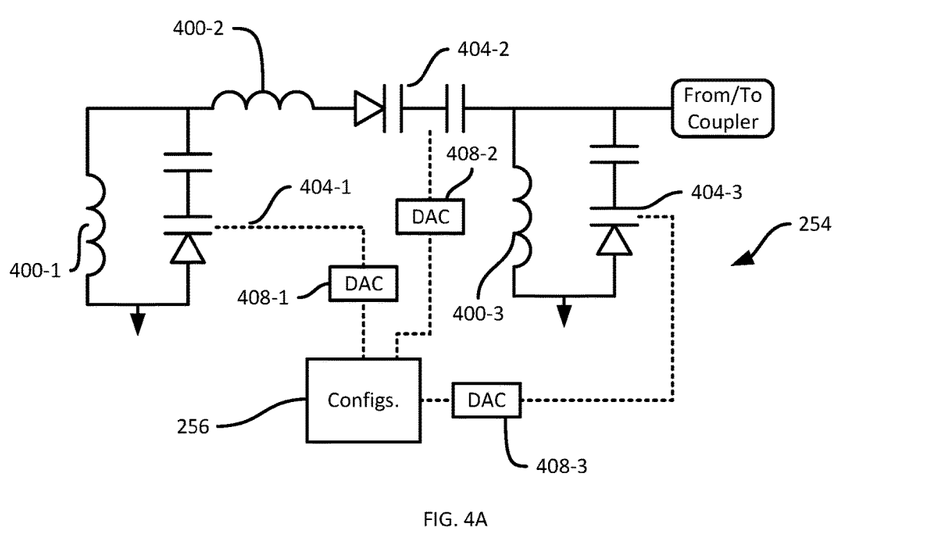
Figure 4B:
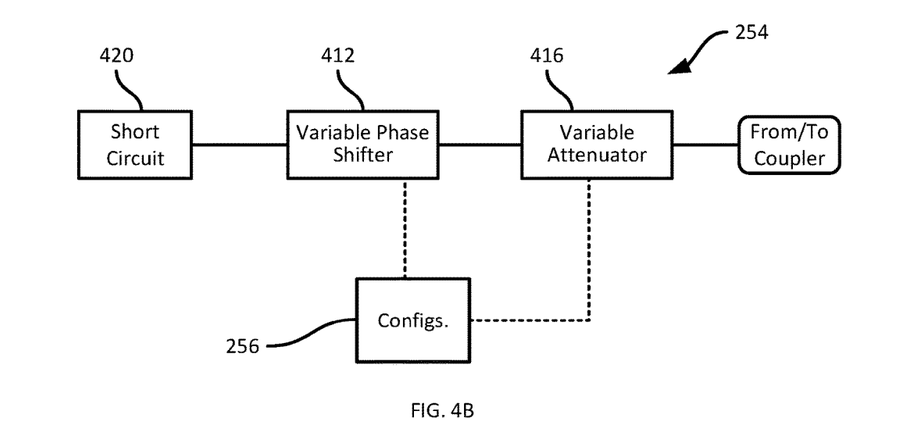

In other examples, the capacitors 304 and 314 may be implemented as digitally-configurable Micro-Electro-Mechanical Systems (MEMS) capacitors. In further examples, the capacitors 304 and 314 need not be digitally controlled. The capacitors 304 and 314 may instead be analog elements, such as varactors (also referred to as varicaps), and the operational parameters stored by the configuration element 256 can include voltage levels or the like employed to control capacitance in the varactors. An analog implementation is shown in FIG. 4B, in which the variable reflector 254 is based on a pi network, including a first inductor 400-1 paired in parallel with a first configurable capacitor 404-1, a second inductor 400-2 in series with a second configurable capacitor 404-2, and a third inductor 400-3 in parallel with a third configurable capacitor 404-3. The capacitors 404 are varactors, and control of the capacitors 404-1, 404-2 and 404-3 is effected by the configuration element 256 via first, second and third digital-to-analog converters (DAC) 408-1, 408-2 and 408-3, respectively. In further examples, the capacitors 404 may be implemented as analog MEMS devices. In still further examples, the capacitors 304, 314 or 404 need not be controllable. Instead, the capacitors 303, 314 or 404 can have fixed capacitances, and the inductors 300, 310 and 400 can instead be tuned via any of the control mechanisms mentioned above.

FIG. 4B illustrates a further example variable reflector 254, including a variable phase shifter 412 and a variable attenuator 416, along with a short circuit 420. In other examples, the short circuit 420 may be replaced by an open circuit. The variable phase shifter 412 and a variable attenuator 416 may be digitally controllable over any suitable interface (e.g. USB or the like) by the configuration element 256.

Figure 5:
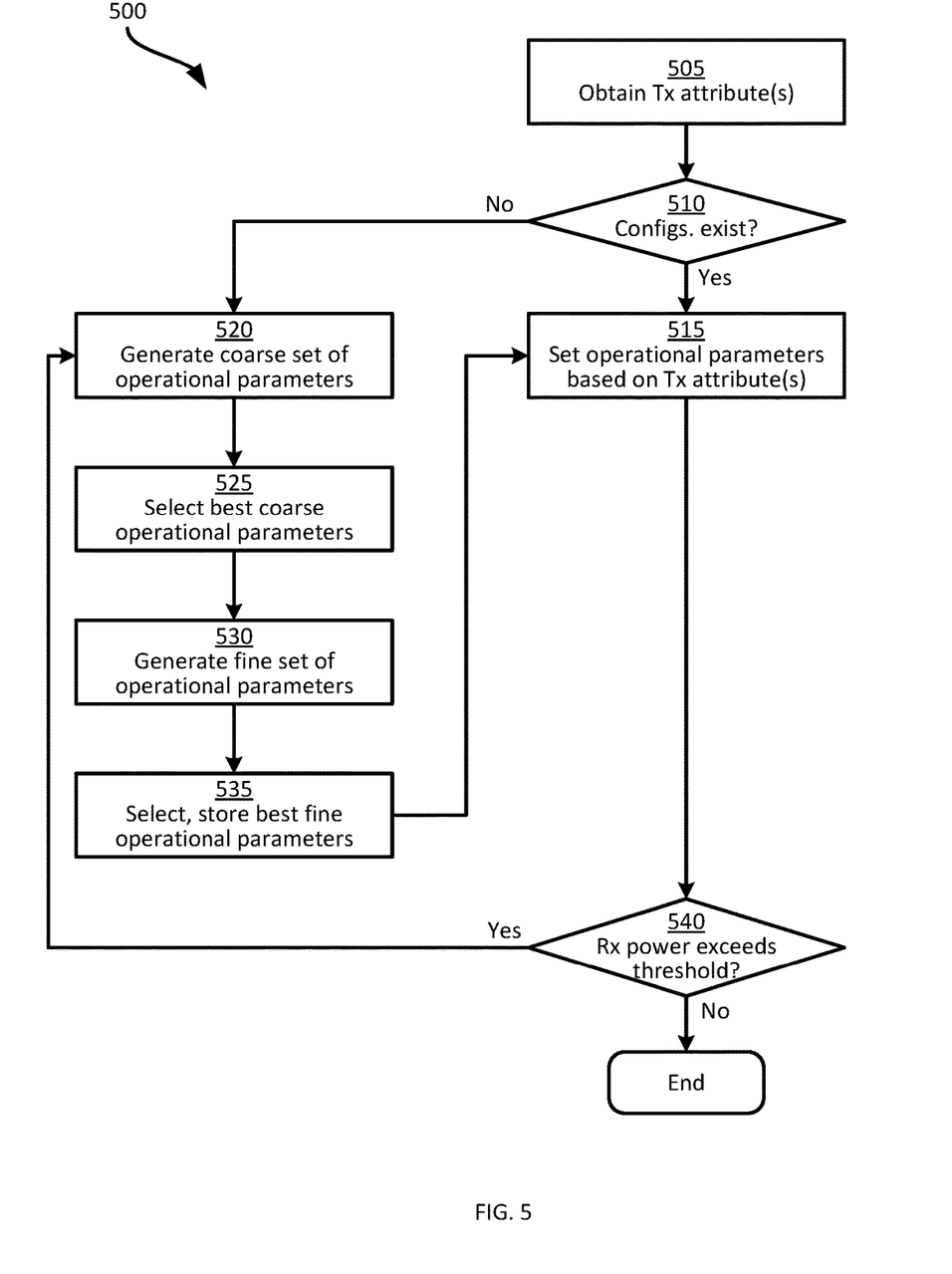
FIG. 5 is a flowchart of an echo cancellation method.

Turning now to FIG. 5, mechanisms for configuring the variable reflector 254 and, under certain conditions, populating the configuration element 256 with operational parameters, will be described. In particular, FIG. 5 illustrates a method 500 for echo cancellation within the reader 104. The method 500 can be performed, for example, by the controller 212 in conjunction with the other components of the reader 104 as illustrated in FIG. 2.

At block 505, the controller 212 is configured to obtain transmission attributes (i.e. attributes of the transmitted signal to be generated by the transmit module 200 for emission via the antenna module 216). The attributes obtained at block 505 include, in the present example, an identifier of one of a plurality of channels (e.g. frequency bands), as well as an antenna identifier. The antenna identifier can identify a particular one of the antenna elements 112, a combination of the antenna elements 112, or the like. In general, the antenna identifier, which may also be referred to as a port identifier (identifying a port of the reader 104 to which the corresponding antenna 112 is coupled), indicates which antenna 112 or set of antennae 112 are to be employed to generate the transmitted signal. The transmission attributes can be selected by the controller 212 according to any suitable selection mechanism. For example, the attributes can be selected according to one or more preconfigured default settings stored at the controller 212, according to measurements of channel interference in the environment in which the reader 104 is deployed, and the like.

At block 510, the controller 212 (or an auxiliary controller associated with the configuration element 256, in some embodiments) is configured to determine whether the configuration element 256 contains (e.g. stored in a lookup table as mentioned earlier) operational parameters for the variable reflector 254 that correspond to the attributes obtained at block 505. When the determination at block 510 is affirmative, indicating that the configuration element 256 includes operational parameters for configuring the variable reflector 254, the performance of the method 500 proceeds to block 515.

At block 515, the controller 212 is configured to retrieve the operational parameters corresponding to the attributes obtained at block 505 from the configuration element 256, and to set the retrieved operational parameters at the variable reflector. For example, when the operational parameters define capacitance values for digitally tuned capacitors as noted above, the configuration element 256 may store a plurality of sets of capacitance values, each set corresponding to a particular set of transmission attributes (e.g. a particular combination of channel and antenna configuration). The controller 212 and/or the configuration element 256 are therefore configured, at block 515, to retrieve a specific set of capacitance values and to transmit the capacitance values to the capacitors (e.g. the capacitors 304 as shown in FIG. 3A). The reader 104 can then begin operating, by generating transmitted signals and detecting tag responses from radiation received at the antenna elements 112 (to which a cancellation signal is applied by the variable reflector 254 according to the parameters set at block 515).

When the determination at block 510 is negative, indicating that the configuration element 256 does not contain operational parameters for configuring the variable reflector 254 that correspond to the transmission attributes obtained at block 505, the controller 212 is configured to generate such operational parameters via the performance of blocks 520-535. As will be apparent in the discussion below, the controller 212 can therefore be configured to populate the configuration element 256 with operational parameters following deployment of the reader 104.

At block 520, the controller 212 is configured to generate a coarse set of candidate operational parameters. For example, the controller 212 can be configured to generate a plurality of vectors each defining capacitance values for each capacitor 304 (e.g. fifty vectors each defining three capacitance values, in connection with the embodiment shown in FIG. 3A; it will be apparent that a wide variety of other sizes of coarse sets of parameters may also be employed). The coarse set of operational parameters can be generated randomly, such that the capacitance values (or any other suitable operational parameters) are selected at random from the full range of possible values for such parameters. As a result, the coarse set of operational parameters represent a plurality of states for the variable reflector 254, distributed randomly across the full range (e.g. of amplitude and phase) of cancellation signals that can be generated by the variable reflector 254.

At block 525, the controller 212 is configured to select one of the coarse set of parameters (e.g. one of the above-mentioned vectors, defining three capacitance values), according to the echo cancellation performance of the coarse set of operational parameters. For example, the controller 212 can be configured to apply each of the coarse set of operational parameters to the variable reflector 254 and, for each operational parameter, to determine a power level of a received signal at the receive module 224. Various mechanisms for determining received power will be discussed in greater detail below. The controller 212 may be configured to select the operational parameter that yields the lowest receive power (i.e. that provides the greatest degree of cancellation of the coherent echo). In other examples, the controller 212 can be configured, instead of applying each of the coarse set of operational parameters in turn and selecting the operational parameter with the best echo cancellation performance, to compare each received power level to a predefined threshold and to select the first operational parameter from the coarse set that meets the threshold.

At block 530, the controller 212 is configured to generate a fine set of candidate operational parameters (e.g. a further set of fifty vectors each defining three capacitance values), based on the selected one of the coarse set from block 525. That is, rather than distributing the fine set over the full operational range of the variable reflector 254, the controller 212 can be configured to generate the fine set by selecting operational parameters at random within a certain predetermined range of values of the selected operational parameter from the coarse set.

At block 535, the controller 212 is configured to select the best performing one of the fine set of operational parameters, as described above in connection with block 525. The controller 212 is configured to store the selected operational parameter from the fine set in the configuration element 256, and to then proceed to block 515.

Following the setting of operational parameters at the variable reflector 254, the controller 212 can be configured, at block 540, to determine whether a power level at the receive module 224 exceeds a threshold (e.g. 2 dBm). When the determination at block 540, performance of the method 500 ends. More specifically, the reader 104 can continue operating, for example until operation is no longer required (e.g. and the reader 104 is configured to power down), or until a change in transmission attributes occurs, following which another performance of the method 500 occurs. The determination at block 540 can also be repeated periodically during operation.

An affirmative determination at block 540 may indicate that echo cancellation performance is insufficient. Therefore, when the determination at block 540 is affirmative, the controller 212 is configured to proceed to block 520, to update the current operational parameters for the active transmission attributes.

The controller 212 may also be configured, at block 540, to open or close the switch 244 disabling (i.e. bypassing) or enabling the LNA 232. For example, when the determination at block 540 is affirmative, the controller 212 can be configured to open the switch 244, disconnecting the LNA 232 until echo cancellation performance has improved.

Figure 6:
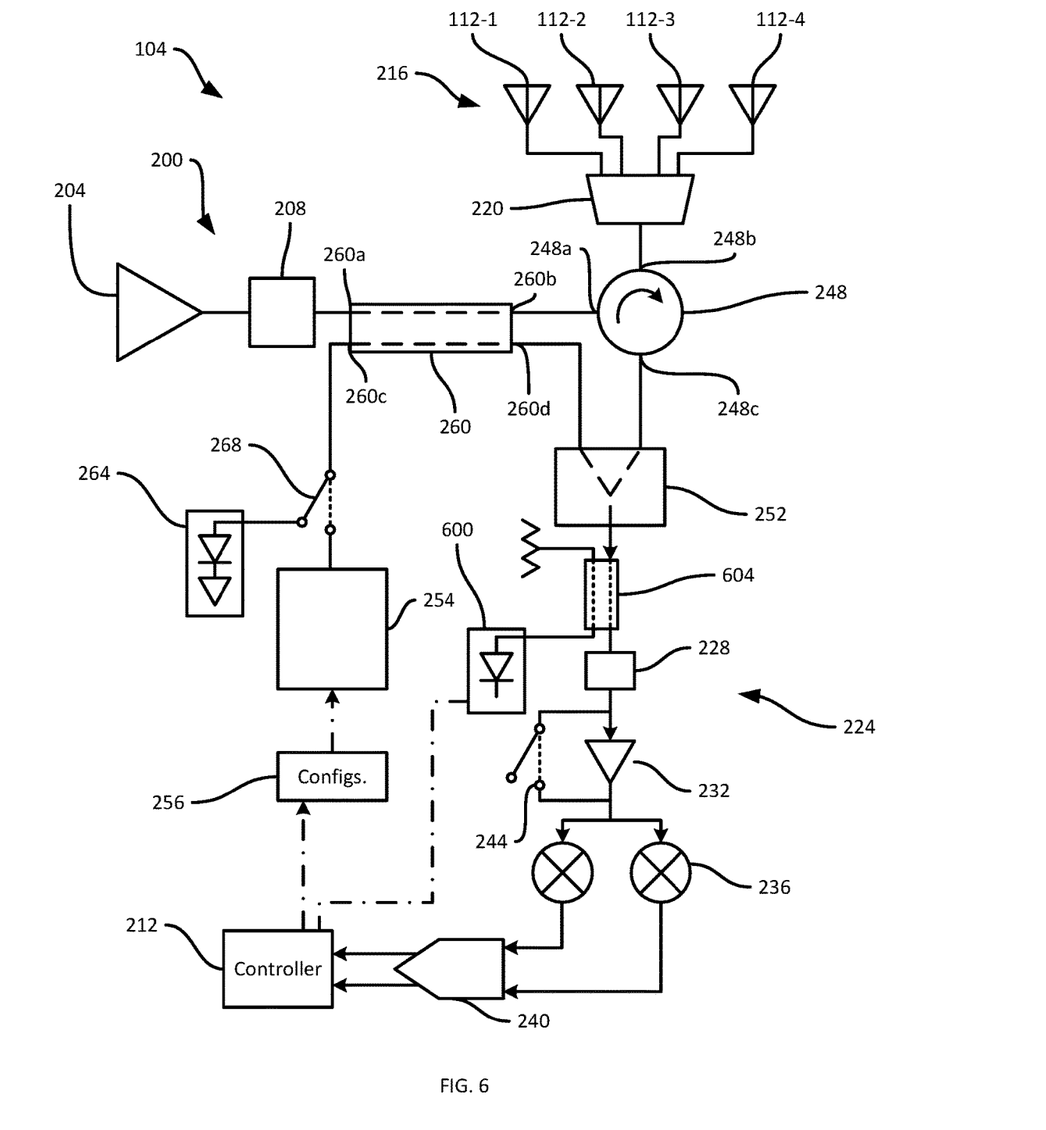
FIGS. 6 and 7 are block diagrams of certain internal components of the RFID reader of FIG. 1, according to additional embodiments.

Turning to FIG. 6, certain internal components of the reader 104 are shown as illustrated in FIG. 2, along with additional components configured to measure the power of received signals. Such measurements can be employed to select operational parameters at blocks 525 and 535, and to monitor echo cancellation performance at block 540. In particular, as shown in FIG. 6 the reader 104 includes a power detector 600 configured to receive a coupled sample of the received signal (via a coupler 604), and to provide a power measurement to the controller 212.

The power detector 600 can also be employed, in conjunction with the switch 268 mentioned earlier, to obtain transmission attributes at block 505. In particular, rather than storing operational parameters in association with channel and/or antenna identifiers, the configuration element 256 can store operational parameters in association with transmission signal amplitude and phase measurements, such as those obtained via the power detector 600. For example, at system start-up, the controller 212 can be configured to open the switch 268, thus disconnecting the variable reflector 254. The power level measured at the power detector 600 is then obtained by the controller 212 and employed (e.g. by generating a vector representation of the measured power level) as an input to look up the appropriate operational parameters for the variable reflector 254. Following setting of the operational parameters at block 515, the switch 268 is closed and normal operation begins.

Figure 7:
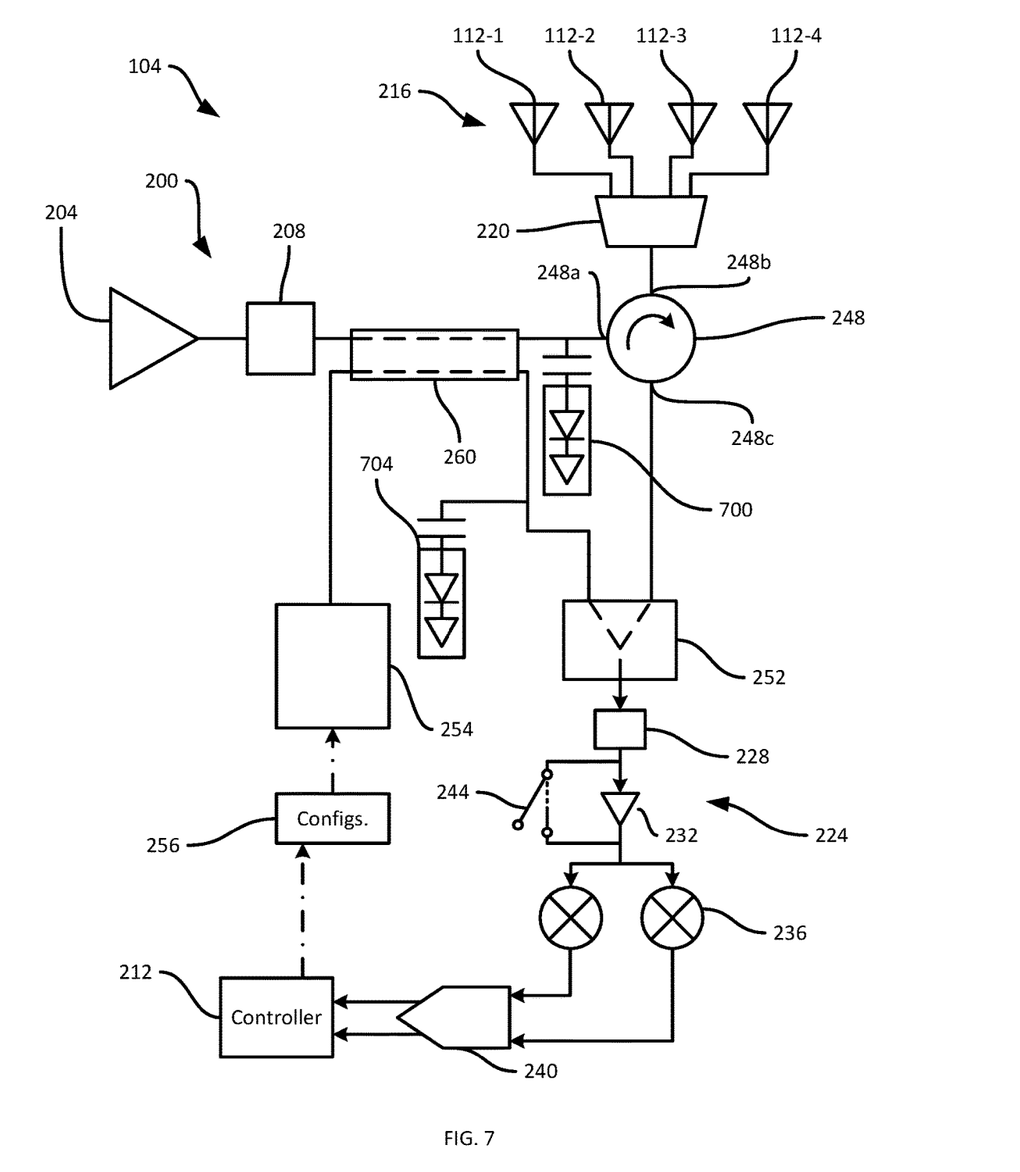

FIG. 7 illustrates another embodiment of the reader 104, in which the power detector 264 and switch 268 are omitted. The omission of the switch 268 may enable increased echo cancellation performance (as signal losses from the switch 268 are no longer incurred). The reader 104 instead includes a power detector 700 on the transmission signal path to measure the transmitted power level, and a power detector 704 on the cancellation signal path to measure the cancellation signal power. The embodiment shown in FIG. 7 may also include the received power detector 600.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An echo cancellation assembly for a radio frequency identification (RFID) tag reader, the assembly comprising:
    a circulator defining (i) a transmission signal path from a transmit module of the tag reader to an antenna module of the tag reader, and (ii) a reception signal path from the antenna module to a receive module of the tag reader;
    a combiner on the reception signal path between the circulator and the receive module;
    a variable reflector configured to apply a cancellation signal to the combiner for cancelling an antenna reflection on the reception signal path;
    a controller configured to set an operational parameter at the variable reflector according to an attribute of a transmitted signal from the transmit module; and
    a coupler defining (i) a segment of the transmission signal path between the transmit module and the circulator, and (ii) a cancellation signal path between the variable reflector and the combiner;
    wherein the coupler is configured to couple a portion of the transmitted signal to the variable reflector; and
    wherein the variable reflector is configured, responsive to receiving the portion of the transmitted signal, to generate the cancellation signal based on the operational parameter, for transmission to the combiner via the cancellation signal path.

2. The echo cancellation assembly of claim 1, further comprising:
    a low-noise amplifier on the reception signal path between the combiner and the receive module.

3. The echo cancellation assembly of claim 2, further comprising:
    a switch on the receive path having a closed position for bypassing the low-noise amplifier, and an open position;
    wherein the controller is configured to maintain the switch in the closed position until a power level on the reception signal path at the receive module is below a predefined threshold.

4. The echo cancellation assembly of claim 1, wherein the controller is configured to:
receive a channel identifier corresponding to the transmitted signal; and
select the operational parameter according to the channel identifier.

5. The echo cancellation assembly of claim 4, wherein the antenna module includes a plurality of antenna elements; and
wherein the assembly further comprises a multiplexer connecting the antenna elements to the circulator.

6. The echo cancellation assembly of claim 5, wherein the controller is further configured to receive an antenna identifier corresponding to the transmitted signal, and to select the operational parameter according to the channel identifier and the antenna identifier.

7. The echo cancellation assembly of claim 4, wherein the controller is configured to:
store a plurality of operational parameters in a memory corresponding to respective channel identifiers.

8. The echo cancellation assembly of claim 4, wherein the controller is configured to generate the operational parameter by:
generating a coarse set of candidate operational parameters and applying each of the candidate operational parameters in the coarse set to the variable reflector in sequence;
based on measured power levels at the receive module corresponding to each of the candidate operational parameters in the coarse set, selecting a preliminary operational parameter from the coarse set;
generating a fine set of candidate operational parameters based on the preliminary operational parameter;
based on measured power levels at the receive module corresponding to each of the candidate operational parameters in the fine set, selecting a final operational parameter from the fine set; and
storing the final operational parameter in a memory.

9. The echo cancellation assembly of claim 1, wherein the variable reflector includes a capacitor; and
wherein the operational parameter defines a capacitance for the capacitor.

10. The echo cancellation assembly of claim 9, wherein the variable reflector includes a resonant circuit.

11. The echo cancellation assembly of claim 9, wherein the variable reflector includes a variable phase shifter coupled to a variable attenuator.

12. An echo cancellation method, comprising:
obtaining, at a controller of a radio frequency identification (RFID) tag reader, a transmission attribute of a transmitted signal;
setting an operational parameter at a variable reflector of the RFID tag reader based on the transmission attribute;
generating the transmitted signal at a transmit module of the RFID tag reader;
generating, at the variable reflector, a cancellation signal based on the transmitted signal and the operational parameter;
detecting a received signal at an antenna module of the RFID tag reader; and
applying the cancellation signal to the received signal.

13. The echo cancellation method of claim 12, wherein obtaining the transmission attribute comprises, at the controller: selecting a channel identifier for the transmitted signal.

14. The echo cancellation method of claim 13, wherein obtaining the transmission attribute further comprises, at the controller: selecting an identifier of one of a plurality of antenna elements of the antenna module.

15. The echo cancellation method of claim 14, further comprising: storing a plurality of operational parameters in a memory connected to the controller; wherein each operational parameter is associated with a combination of a channel identifier and an antenna identifier.

16. The echo cancellation method of claim 12, wherein setting the operational parameter comprises:
transmitting the operational parameter to a component of the variable reflector.

17. The echo cancellation method of claim 16, wherein the variable reflector comprises a plurality of configurable capacitors, and wherein transmitting the operational parameter comprises transmitting respective capacitances to each of the configurable capacitors.

18. The echo cancellation method of claim 12, further comprising generating the operational parameter by:
generating a coarse set of candidate operational parameters and applying each of the candidate operational parameters in the coarse set to the variable reflector in sequence;
based on measured power levels at the receive module corresponding to each of the candidate operational parameters in the coarse set, selecting a preliminary operational parameter from the coarse set;
generating a fine set of candidate operational parameters based on the preliminary operational parameter;
based on measured power levels at the receive module corresponding to each of the candidate operational parameters in the fine set, selecting a final operational parameter from the fine set; and
storing the final operational parameter in a memory.

19. The echo cancellation method of claim 12, further comprising:
at the controller, determining a power level of the received signal; and
when the power level of the received signal exceeds a threshold, updating the operational parameter.

20. The echo cancellation method of claim 12, further comprising:
at the controller, determining a power level of the received signal;
when the power level of the received signal does not exceed a threshold, applying the received signal to a low-noise amplifier; and
when the power level of the received signal exceeds the threshold, bypassing the low-noise amplifier.

* * * * *